US005212348A

United States Patent [19]

Gibson

[11] Patent Number: 5,212,348

[45] Date of Patent: May 18, 1993

[54] PARTIALLY-STRIPPED REINFORCED ELECTRIC SIGNAL CABLE AND PROCESSES FOR MANUFACTURE AND TERMINATION THEREOF

[75] Inventor: Rowland W. Gibson, Newark, Del.

[73] Assignee: W. L. Gore & Associates, Inc., Newark, Del.

[21] Appl. No.: 731,595

[22] Filed: Jul. 17, 1991

[51] Int. Cl.[5] .............................................. H02G 15/02

[52] U.S. Cl. .................................... 174/74 R; 29/869; 174/75 D; 174/75 C; 174/76; 174/117 F; 439/493; 439/495; 439/892; 439/936

[58] Field of Search ................ 174/74 R, 75 D, 75 C, 174/76, 117 R, 117 F, 117 FF; 29/868, 869, 873; 439/492, 493, 495, 892, 936

[56] References Cited

U.S. PATENT DOCUMENTS

| | | | |
|---|---|---|---|
| 3,794,522 | 2/1974 | Mueller et al. | 174/117 F X |
| 4,406,915 | 9/1983 | Lang | 174/117 F |
| 4,424,403 | 1/1984 | Bogese, II | 174/117 F X |
| 4,681,222 | 7/1987 | Longhenry | 206/347 |
| 4,817,281 | 4/1989 | Sugawara | 174/117 F |
| 5,038,001 | 8/1991 | Koegel et al. | 174/117 F X |

OTHER PUBLICATIONS

Apgar, M. et al.; Connector Aligner Aid; IBM Technical Disclosure Bulletin; vol. 26, No. 1; Jun. 1983; p. 218.

Renz, U.; Contact Insertion Method; ;IBM Technical Disclosure Bulletin; vol. 22, No. 4; Sep. 1979; pp. 1508-1509.

*Primary Examiner*—Morris H. Nimmo

*Attorney, Agent, or Firm*—Gary A. Samuels

[57] ABSTRACT

A partially stripped reinforced electric signal cable and processes for its manufacture and termination by use of an easily-removable hardenable reinforcing material which allows maintenance of conductor alignment and manipulation during termination of the cable with removal of the reinforcing material during the termination process in order to facilitate completion of the termination.

11 Claims, 3 Drawing Sheets

PARTIALLY-STRIPPED REINFORCED ELECTRIC SIGNAL CABLE AND PROCESSES FOR MANUFACTURE AND TERMINATION THEREOF

FIELD OF THE INVENTION

The invention pertains to electric signal cables, in particular to flat multiconductor ribbon cables, prepared for termination and to processes for preparing such cables for termination and their termination to electrical connectors.

BACKGROUND OF THE INVENTION

The present trend in electric signal cables and connectors for linking cables to electric and electronic devices and instrumentation is for the cables and connectors to be increasingly smaller and more lightweight so that they require less space which with less weight make the devices and instruments containing them smaller and more portable. As the dimensions and weight decrease, it becomes increasingly difficult to manipulate very small cables, connectors, and devices to effect their termination without damage so as to insure proper functionality and good reliability.

SUMMARY OF THE INVENTION

The present invention provides prepared partially stripped miniature electric cables suitable for easy termination without damage to give reliable terminations to connectors having very close contact pin spacings. Processes for preparing the cables and terminating them by methods which overcome the present problems associated with terminating very small components also comprise an integral part of the invention.

The invention comprises a reinforced stripped or partially stripped electric cable comprising at least one center conductor surrounded by insulating material having the bared conductor surrounded and reinforced against bending, uneven alignment with adjacent conductors, or substantial movement by an easily-removable hardenable reinforcing material which allows maintenance of conductor alignment and manipulation during termination. In one embodiment of the invention, a segment of insulating material is separated from the remainder of the insulating material of the cable and positioned at the end of the conductor with the reinforcing material applied and hardened around the conductor between the two portions of insulating material.

To begin the termination process of the invention, the segment of insulation positioned at the end of the center conductor is carefully stripped or pulled from the center conductor and the exposed end of conductor inserted into an appropriately sized and configured termination receptacle. If the cable is a flat ribbon cable having a multiplicity of conductors, all the exposed ends of conductors are in alignment for easy insertion as a group in a properly sized and configured or termination receptacles of a connector.

The reinforced cable at this juncture has the reinforcing material removed, preferably by a heating process, and the center conductors thereof inserted further into the termination receptacles for completion of the termination, having up to that point been maintained in alignment by the reinforcing material and segment of insulating material.

The fully inserted center conductors are now crimped, soldered, or held in place by flexible contacts to complete the termination of the center conductors to the connector. Further steps to complete the cable termination may now be carried out, such as application of further insulation or any cable shielding which may be present in the cable to the connector ground, and closure and/or sealing of such protective shell portions as may be required to the body of the connector.

The invention is applicable to shielded and coaxial shielded electric cables as well as simple insulated conductors and flat ribbon cables containing a multiplicity of center conductors and ribbon cables comprising a multiplicity of coaxial cables or ribbon cables wherein the signal conductors are shielded as a unit by conductive shielding.

In the case of shielded cables, in the stripping process, the shielding is folded back over the cable after loosening it from around the center conductors and surrounding insulating material to leave the insulating material and center conductors exposed for subsequent stripping procedures. After the center conductors are terminated to a connector, the shielding is subsequently folded back down over the insulated center conductors and appropriately trimmed and connected to a grounding means or contact provided for the purpose on the connector body or an another component of the complete connector.

The above embodiment of the reinforced cable of the invention is particularly useful for very small ribbon cables containing very small gauge center conductors which are to be connected to very small cable connectors having contacts on very close centers. The cables and the processes of the invention provide a means to avoid damage and misalignment inherent in terminating very small and delicate cables and conductors, a means useful in principle of operation and application down to the limits of usefulness of the material components of the cables and connectors.

The processes of preparing the embodiments of the reinforced cables of the invention and terminating them to a connector also comprise a part of the invention as will be further described and delineated in the description of drawings and claims to the invention.

DESCRIPTION OF THE INVENTION

The invention is now described with reference to the figures to more clearly delineate and point out the various aspects of the articles and processes of the invention.

Figure 1:
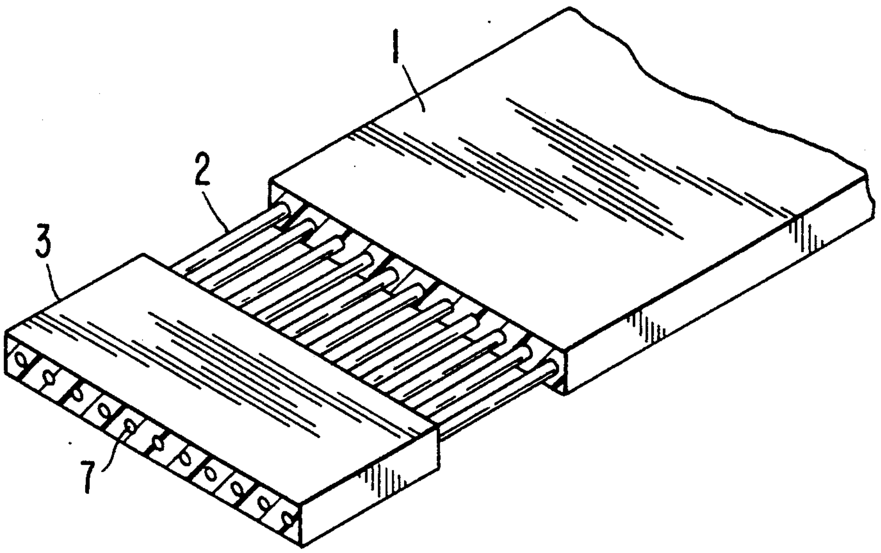
FIG. 1 shows a partially stripped ribbon cable in which the stripped insulating material has been moved to the ends of the conductors to leave the conductor ends covered with insulating material.

In FIG. 1, a common multi-conductor ribbon cable is shown with the conductors 2 surrounded by insulating material 1. A portion 3 of insulating material has been severed from material 1 and pushed along conductors 2 to the end of conductors 2, but not completely removed from conductors 2.

Figure 2:
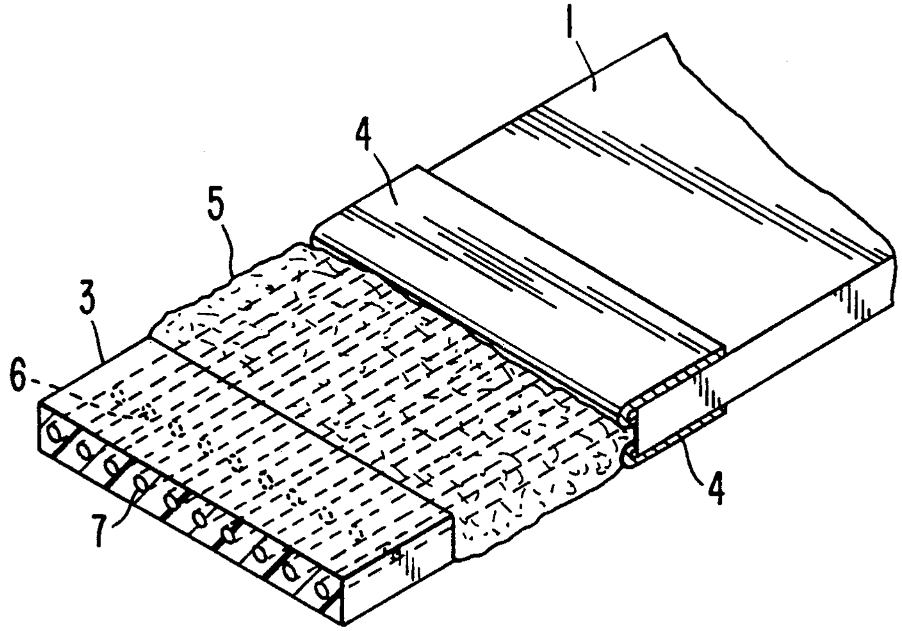
FIG. 2 describes an alternative form of ribbon cable which is shielded on both sides. The shielding is shown folded back along the cable on both top and bottom and the space around the stripped conductors and between the stripped and remaining insulating material filled with easily-removable hardenable reinforcing material.
Figure 3:
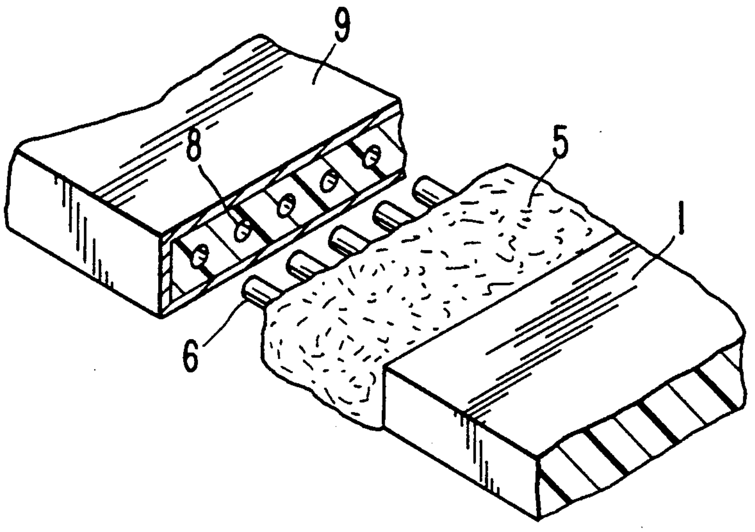
FIG. 3 depicts the cable of FIG. 2 with the insulating material removed from the ends of the conductors, the cable being in position for the ends of the conductors to be inserted as a unit into the matching apertures of an electrical connector.

In FIG. 2, a more complex ribbon cable has been stripped in the same manner as the cable of FIG. 1 as to conductors 2 and insulating material 1, with the upper and lower segments of shielding 4 folded back above and below cable 1. The space surrounding conductors 2 and between segments 3 and 1 of insulating material has been filled with easily-removable hardenable reinforcing material 5, which has hardened in place. The short ends 6 of conductors 2 are shown inside insulating material 3 along with now partially empty apertures 7 formerly occupied by conductors 2.

A reinforced cable of the type shown in FIG. 1 s prepared for termination by stripping off segment 3 of insulating material. The short ends 6 of conductors 2 protruding from reinforcing material 5 are now in condition and properly aligned for insertion into a spaced row of apertures 8 in connector body 9.

Figure 4:
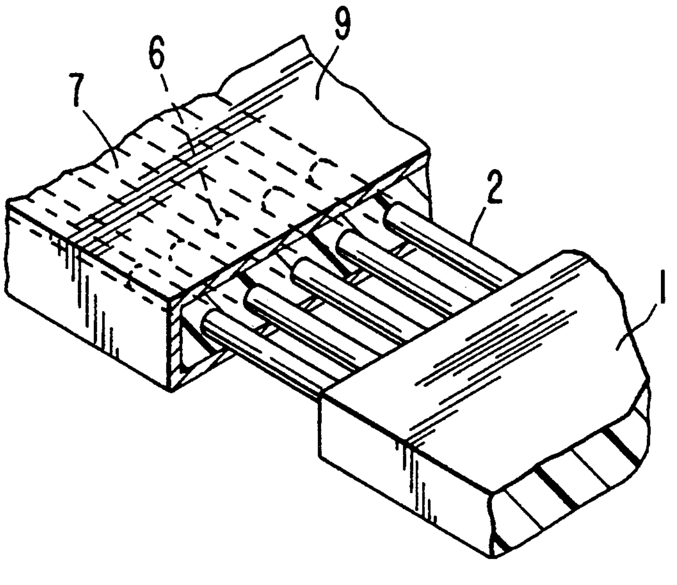
FIG. 4 shows the ends of conductor in place in a connector.
Figure 5:
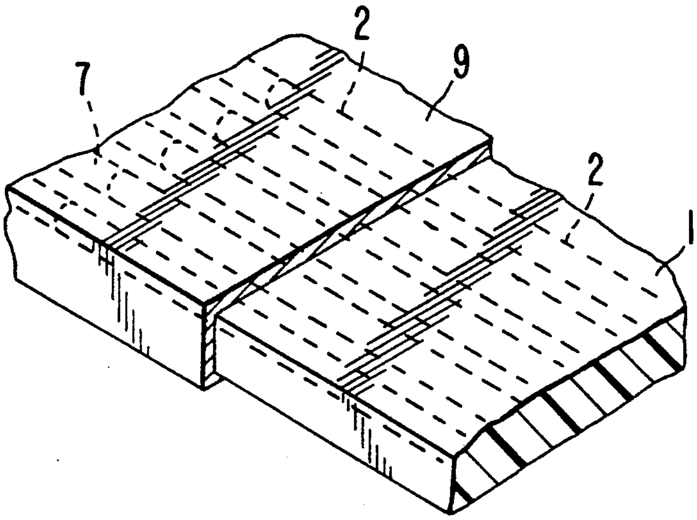
FIG. 5 describes a full closure of a cable with a connector.

The reinforcing material 5 is now removed from the cable and conductors by heating or melting, for example. Comprising reinforcing material 5 may be fluxed solder, an easily meltable metal alloy, solid carbon dioxide, or a meltable resin which leaves no residue on the conductors or insulation when it is melted and removed. After removal of reinforcing material 5, as depicted in FIG. 4, the conductors 5 are pushed fully into apertures 8 to complete closure of cable 1 with connector body 9 to effect complete termination as shown in FIG. 5.

A cable, such as the shielded cable shown in FIG. 2, is terminated by removing end 3 of insulating material carefully from the ends 6 of center conductors 2, inserting ends 6 as a unit into an array of spaced apertures or connector terminating slots, grooves, or other holding means known in the art, in a connector, removing by melting, for example, reinforcing material 5, pushing conductors 2 fully into the termination means provided for them, folding back shielding 4 over the connector for grounding termination, and completion of the termination by enclosing in connector shells, extruded jacketing, or the like.

Figure 6:
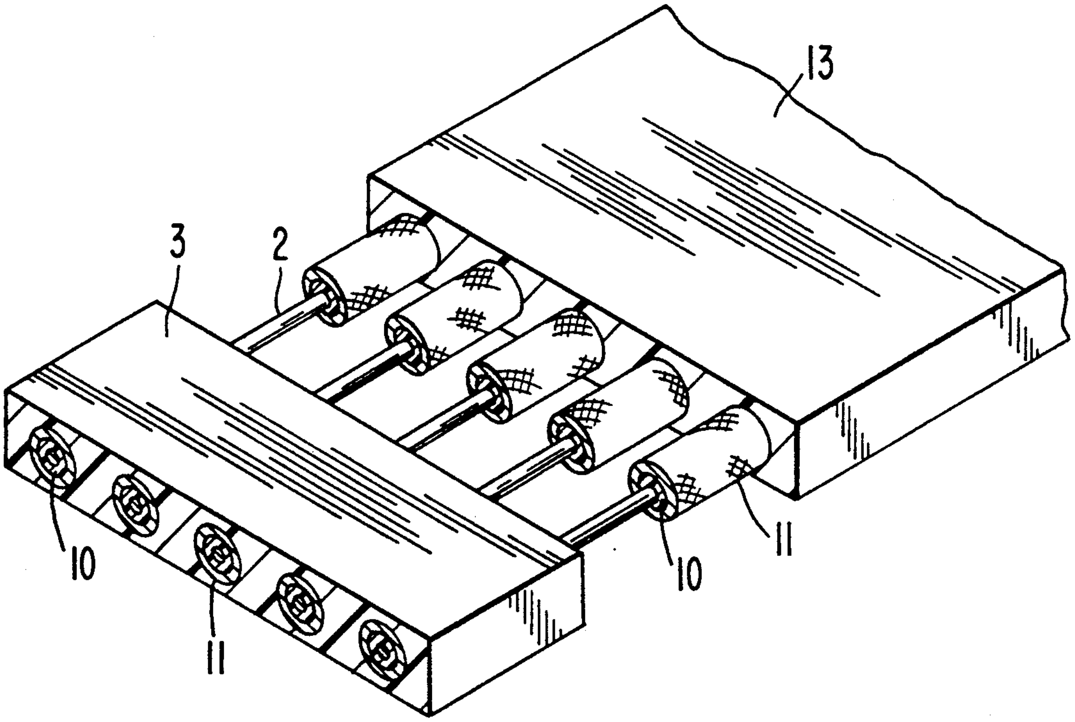
FIG. 6 depicts a ribbon coaxial cable stripped for termination, braided shielding exposed, the cable primary insulating material stripped from the center conductors, and a portion of insulating material surrounding the coaxial cables in place on the ends of the center conductors.

A coaxial ribbon cable is described in FIG. 6 in which a short band of the outer cable insulating material 13 has been slit to the level of shielding 11 (depicted here as braided) and the band of insulating material 13 peeled from the cable. The shielding 11 and underlying main cable insulating material 10 are now slit to the level of the center conductors 2 at a point adjacent to end 3 of insulating material and end 3 slid outwardly toward the end of conductors 2, but leaving short ends of conductors 2 still enclosed by end 3. Shielding 11 may be braided wire, served wire, or metal-coated polymer tape, for example, wrapped around insulating material 10 and may be cut, shaped, or otherwise conveniently formed for grounding and termination to the connector or printed circuit board (PCB) to which the cable is being terminated. A strip or bar of conductive material, such as metal, may be clipped, soldered, or otherwise affixed to shielding 11 to effect a connection to ground of any or all of the coaxial shielding of the ribbon coaxial cable. Hardenable easily-removable reinforcing material is now applied around conductors 2 between insulating material segments 3 and 13 and allowed to harden. Those materials disclosed above may be used, with preferably liquid carbon dioxide applied to and solidifying around conductors 2, for example. Liquid carbon dioxide is poured over the exposed center conductors of the cable resting on a metal plate, for example. The liquid hardens quickly to a solid as a result of heat loss through evaporation. Also useful instead of carbon dioxide are fluxed solder, low melting alloys, or meltable resins which leave no residue on melting and removal from the center conductors.

Segment 3 of insulating material is now removed and, while the hardenable reinforcing material is still in place, the ends of conductors 2 formerly held aligned in place by segment 3 are inserted into appropriately spaced arrays of apertures as above to begin the termination. Reinforcing material 5 is now removed as above, the conductors 2 fully inserted into the apertures of a connector block or PCB, and the shielding 11 grounded to the connector or PCB.

The inventive products and processes described above thus provide a means to assemble and terminate very tiny cable and connector parts easily under conditions otherwise tedious, difficult, or costly.

It should be noted that the drawings are presented in a scale greatly in excess of that of the actual dimensions of the most useful size of articles of manufacture of the invention which may be of the order of one-half inch or less in overall size.

I claim:

1. A reinforced partially-stripped electric cable comprising:
   (a) at least one center conductor surrounded by insulating material, a segment of said insulating material being separated from the remainder of said insulating material by a gap, said segment of insulating material positioned at the end of said at least one center conductor; and
   (b) an easily-removable hardenable reinforcing material surrounding said at least one center conductor in the gap between said segment of insulating material and said remainder of said insulating material.

2. A cable of claim 1 wherein said reinforcing material is selected from the group consisting of solid carbon dioxide, fluxed solder, low-melting metal alloy, and meltable resin which leaves no residue on melting and removal.

3. A cable of claim 1 including a cable shield.

4. A cable of claim 3 wherein said shield is coaxial to said center conductor.

5. A process for preparing a reinforced partially-stripped electric cable having at least one center conductor surrounded by insulating material comprising the steps of:
   (a) stripping a first segment of said insulating material from the end of a cable having at least one center conductor surrounded by insulating material;
   (b) slitting and severing a second segment of the remaining insulating material;
   (c) moving said second segment of insulating material to the end of said at least one center conductor to leave a gap between said second segment of insulating material and the remainder of said insulating material;

(d) applying an easily-removable hardenable reinforcing material around said at least one center conductor to surround and hold in place said at least one center conductor between said second segment of insulating material and said remainder of said insulating material; and (e) allowing said reinforcing material to harden.

6. A process of claim 5 including applying reinforcing material selected from the group consisting of solid carbon dioxide, fluxed solder, low-melting metal alloy, and meltable resin which leaves no residue on melting and removal.

7. A process for terminating a reinforced partially-stripped electric cable having at least one center conductor surrounded by insulating material, a segment of said insulating material positioned at the end of said cable and separated from the remainder of said insulating material by a gap, and said gap filled by an easily-removable hardenable reinforcing material surrounding said at least one center conductor, comprising the steps of:

(a) removing said segment of insulating material positioned at the end of said cable to expose the end of said at least one center conductor;

(b) inserting the end of said at least one center conductor, exposed by removing said segment of insulating material positioned at the end of said cable, into a matching termination receptacle of an electrical connector;

(c) removing said reinforcing material from around said at least one center conductor;

(d) urging said at least one center conductor fully into said receptacle; and (e) permanently attaching said at least one center conductor to said receptacle.

8. A process of claim 7 including inserting said at least one center conductor into a termination receptacle having a female form.

9. A process of claim 7 wherein the removal of said reinforcing material is by heating.

10. A process for preparing a reinforced stripped electric cable having more than one center conductor surrounded by insulating material and by shielding on one or both sides of the cable comprising the steps of:

(a) severing and stripping a first segment of insulating material from said more than one center conductor near an end thereof which overlies said shielding to leave an unstripped second segment of insulating material on the end of said more than one center conductor.

(b) severing and rolling back above and below said more than one center conductor and said insulating material said shielding;

(c) stripping said unstripped second segment of insulating material lying over said more than one center conductor and under said shielding at the end of said cable;

(d) applying an easily-removable hardenable reinforcing material around said more than one center conductor to surround and hold in place said more than one center conductor between said end and the remainder of said cable;

(e) allowing said reinforcing material to harden; and (f) removing said reinforcing material from said more than one center conductor.

11. A process for preparing a reinforced stripped cable having at least one center conductor surrounded by insulating material and a coaxial shield comprising the steps of:

(a) severing and stripping a first segment of insulating material from said at least one center conductor near an end of said at least one center conductor to leave an unstripped second segment of insulating material on the end of said at least one center conductor;

(b) moving said unstripped second segment of insulating material toward the end of said at least one center conductor to expose said coaxial shield;

(c) affixing a grounding means to said coaxial shield;

(d) moving said unstripped second segment of insulating material further toward the end of said at least one center conductor to expose primary insulating material underlying said coaxial shield and overlaying said at least one center conductor;

(e) stripping said primary insulating material underlying said coaxial shield;

(f) applying an easily-removable hardenable reinforcing material around said at least one center conductor between said coaxial shield and said unstripped second segment of insulating material;

(g) allowing said reinforcing material to harden; and (h) removing said unstripped second segment of insulating material from said at least one center conductor.

* * * * *